US012530110B1

(12) United States Patent
Browder et al.

(10) Patent No.: US 12,530,110 B1
(45) Date of Patent: Jan. 20, 2026

(54) APPARATUS AND METHOD FOR DETERMINING A COMMAND QUEUE AS A FUNCTION OF SENSOR DATA OF A TRANSPORTATION DEVICE

(71) Applicant: Signet Health Corporation, North Richland Hills, TX (US)

(72) Inventors: Blake Browder, Dallas, TX (US); Joy Figarsky, Little Rock, AR (US)

(73) Assignee: BH Operations, LLC, North Richland Hills, TX (US)

( * ) Notice: Subject to any disclaimer, the term of this patent is extended or adjusted under 35 U.S.C. 154(b) by 0 days.

(21) Appl. No.: 19/198,861

(22) Filed: May 5, 2025

Related U.S. Application Data

(63) Continuation of application No. 18/957,737, filed on Nov. 23, 2024, now Pat. No. 12,321,576.

(51) Int. Cl.
  *G06F 3/0484* (2022.01)
  *G06F 3/0482* (2013.01)
  (Continued)

(52) U.S. Cl.
  CPC .......... *G06F 3/0484* (2013.01); *G06F 3/0482* (2013.01); *G06F 9/451* (2018.02); *G07C 5/02* (2013.01)

(58) Field of Classification Search
  CPC ...... G06F 3/0484; G06F 9/451; G06F 3/0482; G07C 5/02
  See application file for complete search history.

(56) References Cited

U.S. PATENT DOCUMENTS

| 5,499,182 A | * | 3/1996 | Ousborne | G06F 11/34 |
| | | | | 701/33.9 |
| 10,392,022 B1 | * | 8/2019 | Rau | G06N 20/20 |

(Continued)

FOREIGN PATENT DOCUMENTS

| CN | 118366136 A | 7/2024 |
| IN | 202141029006 A | 6/2021 |
| RU | 2814789 C1 | 3/2024 |

OTHER PUBLICATIONS

Guangwei Yang et al; Comprehensive Assessment of Artificial Intelligence Tools for Driver Monitoring and Analyzing Safety Critical Events in Vehicles; Sensors 2024, 24(8), 2478.

(Continued)

*Primary Examiner* — Anil K Bhargava
(74) *Attorney, Agent, or Firm* — Caldwell Intellectual Property Law

(57) ABSTRACT

An apparatus and method for determining a command queue as a function of sensor data of a transportation device. The apparatus includes at least a processor and a memory communicatively connected to the at least a processor. The memory instructs the processor to receive dynamic telemetry data from the at least a sensor of the transportation device, generate a plurality of predefined factors as a function of a user profile, generate an assessment model configured to analyze the dynamic telemetry data, wherein analyzing the dynamic telemetry data comprises comparing the dynamic telemetry data to the plurality of predefined factors and calculating a safety score based on a comparison of the dynamic telemetry data to the plurality of predefined factors, display, using a downstream device, a command queue comprising one or more of the plurality of predefined factors as a function of the safety score.

20 Claims, 8 Drawing Sheets

(51) Int. Cl.
  *G06F 9/451*   (2018.01)
  *G07C 5/02*    (2006.01)

(56)         References Cited

U.S. PATENT DOCUMENTS

| | | | | |
|---|---|---|---|---|
| 11,130,042 | B2* | 9/2021 | Tran | A63B 71/145 |
| 11,987,260 | B2 | 5/2024 | Hadapanah et al. | |
| 12,032,730 | B2* | 7/2024 | Sicconi | G06N 20/00 |
| 12,175,773 | B1* | 12/2024 | Kaushik | G06V 20/597 |
| 2013/0018541 | A1* | 1/2013 | Raz | B60W 40/09 |
| | | | | 701/29.1 |
| 2015/0356497 | A1* | 12/2015 | Reeder | G06Q 10/087 |
| | | | | 705/28 |
| 2016/0362118 | A1* | 12/2016 | Mollicone | G05D 1/0276 |
| 2017/0337759 | A1* | 11/2017 | Stirtz | H01H 9/16 |
| 2018/0219759 | A1* | 8/2018 | Brown | G06Q 10/109 |
| 2022/0037038 | A1* | 2/2022 | Robbins | G16H 40/20 |
| 2022/0375599 | A1* | 11/2022 | Abraham | G16H 40/63 |
| 2023/0083899 | A1* | 3/2023 | Gandouet | G06N 20/00 |
| | | | | 705/4 |
| 2023/0230502 | A1* | 7/2023 | Moehr | G09B 19/167 |
| 2023/0394989 | A1* | 12/2023 | Hill | G09B 19/16 |
| 2024/0017737 | A1* | 1/2024 | Hadapanah | G08G 1/096775 |
| 2024/0317262 | A1* | 9/2024 | Tam | B60W 60/0025 |
| 2025/0121818 | A1* | 4/2025 | Gutierrez | G06N 5/01 |

OTHER PUBLICATIONS

Campos-Ferreira, et al.; Vehicle and Driver Monitoring—Using-Sensors (Year: 2023).

* cited by examiner

APPARATUS AND METHOD FOR DETERMINING A COMMAND QUEUE AS A FUNCTION OF SENSOR DATA OF A TRANSPORTATION DEVICE

CROSS-REFERENCE TO RELATED APPLICATIONS

This application is a continuation of Non-provisional application Ser. No. 18/957,737, filed on Nov. 23, 2024, and entitled "APPARATUS AND METHOD FOR DETERMINING A COMMAND QUEUE AS A FUNCTION OF SENSOR DATA OF A TRANSPORTATION DEVICE," the entirety of which is incorporated herein by reference.

FIELD OF THE INVENTION

The present invention generally relates to the field of transportation safety. In particular, the present invention is directed to an apparatus and a method for determining a command queue as a function of sensor data of a transportation device.

BACKGROUND

Transportation services, whether involving public transit, ride-sharing, or personal vehicles, have inherent danger associated with them. Negligent driving can result in serious injuries, damage to property, or loss of life. Additionally, these dangers are not limited to the driver themselves, others on the road, or their passengers are additionally exposed to danger. Existing solutions for improving transportation safety do not adapt adequately to the specific driving styles and habits of users. Additionally, existing solutions do not adequately make use of data collected from the transportation device being operated. Accordingly, existing solutions are not sufficient.

SUMMARY OF THE DISCLOSURE

In an aspect, an apparatus for determining a command queue as a function of sensor data of a transportation device is described. The apparatus includes the transportation device including at least a sensor configured to detect a signal relating to the transportation device. The apparatus further includes at least a computing device, wherein the computing device includes a memory at least a processor communicatively connected to the memory. The memory contains instructions configuring the at least a processor to receive dynamic telemetry data from the at least a sensor of the transportation device, generate a plurality of predefined factors and a safety score associated with the plurality of predefined factors as a function of a user profile and display, using a downstream device, a command queue including one or more of the plurality of predefined factors as a function of the safety score, wherein each command of the command queue is associated with a visual element within a graphical user interface, wherein the visual element is configured to receive user input through an interaction of the visual element and the safety score is dynamically updated based on the interaction, wherein the interaction includes marking a command within the command queue as complete.

In another aspect, a method for determining a command queue as a function of sensor data of a transportation device is described. The method includes receiving, using at least a processor, dynamic telemetry data from at least a sensor of a transportation device, generating, use the at least a processor, a plurality of predefined factors and a safety score associated with the plurality of predefined factors as a function of a user profile and displaying, using a downstream device, a command queue including one or more of the plurality of predefined factors as a function of the safety score, wherein each command of the command queue is associated with a visual element within a graphical user interface, wherein the visual element is configured to receive user input through an interaction of the visual element and the safety score is dynamically updated based on the interaction, wherein the interaction includes These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for determining a command queue as a function of sensor data of a transportation device. The apparatus includes at least a computing device comprised of a processor and a memory communicatively connected to the processor. The memory instructs the processor to receive dynamic telemetry data from the at least a sensor of the transportation device. The processor generates a plurality of predefined factors as a function of a user profile. The processor generate an assessment model configured to analyze the dynamic telemetry data, wherein analyzing the dynamic telemetry data comprises comparing the dynamic telemetry data to the plurality of predefined factors and calculating a safety score based on a comparison of the dynamic telemetry data to the plurality of predefined factors. The memory then instructs the processor to display, using a downstream device, a command queue comprising one or more of the plurality of predefined factors as a function of the safety score.

Figure 1:
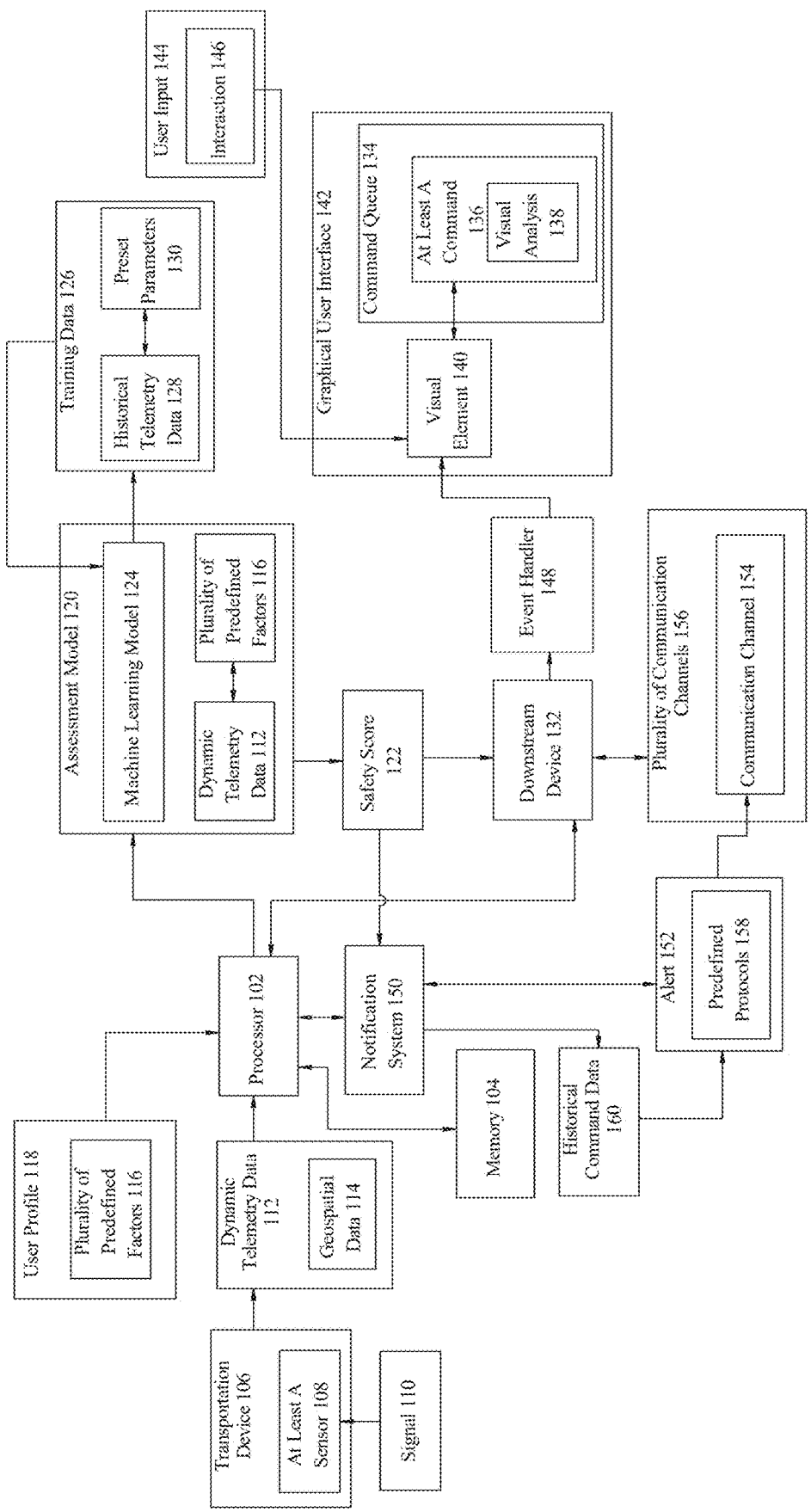
FIG. 1 is a block diagram of an apparatus for determining a command queue as a function of sensor data of a transportation device.

Referring now to FIG. 1, an exemplary embodiment of apparatus 100 for determining a command queue as a function of sensor data of a transportation device is illustrated. Apparatus 100 may include a processor 102 communicatively connected to a memory 104. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a computing device. Communicative connecting may also include indirect connections using, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 104 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 102 may access the information from primary memory.

Still referring to FIG. 1, apparatus 100 may include a database. The database may include a remote database. The database may be implemented, without limitation, as a relational database, a key-value retrieval database such as a NOSQL database, or any other format or structure for use as database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, apparatus 100 may include and/or be communicatively connected to a server, such as but not limited to, a remote server, a cloud server, a network server and the like. In one or more embodiments, the computing device may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by the apparatus computing device. In one or more embodiments, computing device may transmit processes to server wherein computing device may conserve power or energy.

Further referring to FIG. 1, apparatus 100 may include any "computing device" as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing devices operating in concert, in parallel, sequentially or the like; two or more computing devices may be included together in a single computing device or in two or more computing devices. Apparatus 100 may interface or communicate with one or more additional devices as described below in further detail using a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented, as a non-limiting example, using a "shared nothing" architecture.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, the apparatus comprises a transportation device 106 comprising at least a sensor 108 configured to detect a signal 110 relating to the transportation device 106. As used in this disclosure, a "transportation device" is a vehicle or apparatus used for moving people, goods, or materials from one location to another. In a non-limiting example, the transportation device 106 may include land, air, sea, or space-based vehicles, such as cars, trains, airplanes, ships, or spacecraft. As used in this disclosure, a "sensor" is a device or component capable of detecting, measuring, or recording physical, environmental, or operational parameters and converting the detected information into data that can be processed or transmitted. As used in this disclosure, a "signal" is a representation of data or information. In a non-limiting example, the signal 110 may be in the form of a variation in a physical quantity, such as voltage, current, light, and/or sound, which may be transmitted, processed, or interpreted by an electronic or mechanical system. In a non-limiting example, the signal 110 may be analog or digital and is used to convey information from one point to another for monitoring, control, communication, or other purposes. In a non-limiting example, the sensor 108 may detect temperature, speed, pressure, and/or location. In another non-limiting example, a seatbelt sensor may detect whether a seatbelt is fastened by using, for example, a pressure sensor or a mechanical switch in the buckle, sending data to the vehicle's control system to ensure safety compliance. In another non-limiting example, movement sensors, such as accelerometers or gyroscopes, may monitor the transportation device 106 motion, detecting acceleration, braking, or sharp turns, and providing data on driving behavior or triggering safety mechanisms. Continuing, geospatial sensors like GPS receivers may provide real-time data on the transportation device 106 location, speed, and direction, enabling navigation systems or fleet tracking. Additionally, a throttle position sensor may monitor the position of the accelerator pedal, sending signals that help manage engine power and fuel efficiency. Continuing, brake sensors may provide data on brake pad wear or brake pressure, ensuring optimal braking performance. Similarly, engine control sensors, such as oxygen sensors or temperature sensors, monitor the vehicle's internal functions, providing crucial data on engine performance, fuel combustion, or exhaust output. In another non-limiting example, tire pressure sensors, may alert 152 the driver if tire inflation is too low, and steering angle sensors, which track the angle of the steering wheel to provide feedback for stability control systems.

With continued reference to FIG. 1, the at least a sensors 108 may be included in a client device. As used in this disclosure, a "client device" is a device that communicates with a server or another system to access services, applications, or data. Without limitation, the client device may include hardware and software that allow it to send requests, receive responses, and process information. For example, the client device may include smartphones, tablets, laptops, desktop computers, or any other networked device used by an end user to interact with a service or system. For instance, sensors like accelerometers, gyroscopes, or GPS modules may be integrated into a client device to monitor the movement and location of the vehicle. Continuing, these sensors 108 may allow the client device to detect signals 110 such as changes in speed, direction, or the transportation device 106 geographic position, enabling functions like navigation, trip tracking, or crash detection. The client device accelerometer may, for example, detect sudden deceleration, providing critical data in the event of a collision, while the GPS sensor tracks the transportation device 106 real-time location.

With continued reference to FIG. 1, the apparatus may include different hardware for specific measurements. In some embodiments, hardware may be transducers, sensors, and actuators. For the purposes of this disclosure, a "transducer" is a device used to transform one kind of energy into another. When a transducer converts a quantity of energy to an electrical voltage or an electrical current it is called a sensor. A measurable quantity of energy may include sound pressure, optical intensity, magnetic field intensity, thermal pressure, etc. When a transducer converts an electrical signal into another form of energy such as sound, light, mechanical movement, it is called an actuator. It should be noted that sound is incidentally a pressure field. Actuators allow the use of feedback at the source of the measurements.

With continued reference to FIG. 1, a sensor may be considered as a component or with a collection of electronics such as amplifiers, decoders, filters, computer devices and apparatus. For the purposes of this disclosure an "instrument" is a sensor bundled with its associated electronics. However, in some embodiments, sensors may be further integrated with apparatus. For example, the apparatus includes the transportation device 106 including at least a sensor configured to detect a signal 110 relating to the transportation device 106. For instance, the sensor may detect a signal 110 indicating the speed of the transportation device 106, the position of the transportation device 106, or environmental factors within the transportation device 106 such as temperature or pressure that may affect the transportation device 106 operations. The signal 110 detected by the sensor may then be transmitted to a control unit for processing and analysis, allowing for real-time adjustments or monitoring.

With continued reference to FIG. 1, a sensor integrated with apparatus may be linear so that response y to a stimulus x is in the form: $y(x)=Ax$, $0 \le x \le x_{max}$, $A>0$. It should be noted, there is a presumption that the stimulus to be positive. A is the sensitivity of the transducer gain, or the gain of the sensor. The gain is presumed to be positive for which the linear model satisfies the definition of linearity: $y(x+z)=A(x+z)=y(x)+y(z)$. It should be noted that this example is an idealized form of a sensor and may extend beyond the linearity constraints which may include time dependency, memory, and its output keeping track of input. A more generalized sensor may include the steady state transfer function of the sensor. For this case, the sensitivity can be defined as the derivative of the output with respect to the input:

$$S = \frac{\partial y}{\partial x}.$$

In this example, the sensor exhibits sensitivities to other operating parameters (i.e. supply voltage) or temperature. For the purposes of this disclosure, "sensitivity" is the ratio of output to input. This can include electrical output and signal input or an input transducer. It can also include physical output to an electrical input, or an output transducer. Sensitivity can also be used in its usual electrical meaning. In this it would refer to a percent change of a property of a device because of a percent change in a parameter. In some embodiments this would be a percent change in gain as a result of percent change in ambient temperature. This type of sensitivity may be referred to as the Gain of a sensor.

Still referring to FIG. 1, the apparatus 100 with integrated sensors may not respond to arbitrarily small signals. apparatus may respond to signals within a specified range from zero to a sensor threshold which does not cause the output of the sensor to change. The existence of a threshold relates to the nonlinear behavior of the device and the noise. The apparatus with an integrated sensor may fail to respond to stimuli which are arbitrarily large as well. In this case, apparatus integrated with a sensor may have a max range. The full range of apparatus integrated with a sensor may be limited by compression or clipping. Compression and clipping are results of nonlinearity and thus may include apparatus as a nonlinearity device.

Still referring to FIG. 1, referring to the linear equation above assuming a linear sensor is improved with the addition of a constant: $y(x)=b_0+Ax$. It should be noted that the equation is not linear even though it is described as a first order polynomial. The constant is called a zero offset and can be defined in two ways: a sensor reading when the input is zero, or the value of the stimulus required to make the output zero. The zero offset is corrected by subtracting $b_0$ from y and recovering the linear description of a sensor: $y'(x)=y(x)-b_0=Ax$.

With continued reference to FIG. 1, apparatus may include very fast measurements where it can internally store energy. Apparatus output may depend on previous measurements the integrated sensors make. It should be noted that the sensor may exhibit memory. The time dependence of a sensor can be linear if the response is described by a linear differential equation:

$$\sum_{n=0}^{N} A_n \frac{\partial^n y}{\partial t^n} = \sum_{k=0}^{k} B_k \frac{\partial^k x}{\partial t^k}.$$

Taking the Laplace transform of this equation:

$$y(s, X) = \left( \frac{\sum_{k=0}^{K} B_k S^k}{\sum_{n=0}^{N} A_n S^n} \right) x = H(s)X(s),$$

which is in Laplace transform space and the sensor response is still linear in stimulus x. The response of a sensor with a transfer function H(s) at time t is the convolution integral between the history of the stimulus x and the inverse Laplace transform h(t)

$$H(s): y(t) = \int_0^\infty h(\tau)x(t-\tau)d\tau.$$

Apparatus may behave like a low pass filter, wherein there is a delayed response to their input. There is a limit to the maximum stimulus frequency that can be detected. The maximum frequency a sensor can interpret is approximately the inverse of its response time.

Still referring to FIG. 1, processor 102 is configured to receive dynamic telemetry data 112 from the at least a sensor 108 of the transportation device 106. As used in this disclosure, "dynamic telemetry data" is data that is collected in real-time or near real-time from one or more sources. In a non-limiting example, the dynamic telemetry data 112 may be collected from sources like sensors 108. In another non-limiting example, the dynamic telemetry data 112 may include operational status, conditions, or environmental parameters of a system or device. For example, the dynamic telemetry data 112 may include operational status updates such as fuel levels, engine performance, or battery charge of an electric vehicle. Continuing, the dynamic telemetry data 112 may include the temperature fluctuations inside an engine compartment, the rate of acceleration or deceleration, and/or environmental conditions such as road surface quality or surrounding air pressure impacting the device's operation. In another non-limiting example, the dynamic telemetry data 112 may include With continued reference to FIG. 1, the dynamic telemetry data 112 may include geospatial data 114. As used in this disclosure, "geospatial data" is data that includes information about the geographic location of objects, or activities on Earth. In a non-limiting example, the geospatial data 114 may be represented in terms of coordinates, such as latitude, longitude, altitude, and the like. In an embodiment, the geospatial data 114 may include additional contextual information such as time, environmental conditions, or attributes related to specific locations. Without limitation, the geospatial data 114 may be collected by GPS systems, satellites, sensors, mapping technologies, and the like. Without limitation, the geospatial data 114 may be used for applications such as navigation, location tracking, and geographic analysis.

Still referring to FIG. 1, processor 102 is configured to generate a plurality of predefined factors 116 as a function of a user profile 118. As used in this disclosure, "predefined factors" are specific criteria, parameters, or conditions that are established in advance and used to influence or determine the behavior, outcomes, or decisions of a system, process, or device. In a non-limiting example. The predefined factors 116 may include thresholds, ranges, settings, rules, and the like, that have been set prior to execution. In a non-limiting example, the predefined factors 116 may be set up manually by a user and/or automatically by a system. Without limitation, the predefined factors 116 may guide operations by serving as reference points for comparison, triggering actions, or controlling the flow of a process based on the inputs or data received. As used in this disclosure, a "user profile" is a collection of data that represents information about a specific user. For instance, without limitation, the user profile 118 may include user preferences, behaviors, interactions, and the like. Without limitation, the user profile 118 may include personal information such as name, contact details, demographic data, and the like, as well as data related to the user's usage patterns, interests, settings for personalized experiences or services, and the like. Continuing, the user profile 118 information may be stored and used by the application to tailor content, functionalities, recommendations, and the like, to the individual user.

Still referring to FIG. 1, processor 102 is configured to generate an assessment model 120 configured to analyze the dynamic telemetry data 112, wherein analyzing the dynamic telemetry data 112 may include comparing the dynamic telemetry data 112 to the plurality of predefined factors 116 and calculating a safety score 122 based on a comparison of the dynamic telemetry data 112 to the plurality of predefined factors 116. As used in this disclosure, an "assessment model" is a computational or analytical framework that processes data to evaluate, predict, or classify certain outcomes based on predefined criteria or inputs. Continuing, the assessment model 120 may include algorithms, decision rules, machine learning techniques, and the like, that are designed to analyze data in a structured manner and generate insights, ratings, or decisions. Without limitation, the assessment model 120 may be designed to systematically process various forms of input data, such as sensor 108 readings or user information, and provide meaningful results or actions based on that analysis. As used in this disclosure, a "safety score" is a numerical or categorical rating that represents the safety performance or risk level of a system, individual, or process. Continuing, the safety score 122 may be calculated based on the analysis of various factors, such as real-time data, historical data, or predefined safety criteria. Without limitation, the safety score 122 may be used to evaluate how safely the transportation device 106 is being operated, identify potential hazards, and/or assess compliance with safety protocols. In a non-limiting example, the safety score 122 may be displayed to users or operators to provide feedback and guide improvements in behavior or system performance. In this non-limiting example, the dynamic telemetry data 112 is continuously collected from various sensors 108 within the transportation device 106, such as speed sensors, accelerometers, or geospatial data sensors. Continuing, the assessment model 120 may process this data to provide meaningful insights into the operational behavior of the transportation device 106. For instance, without limitation, if the dynamic telemetry data 112 indicates rapid acceleration or harsh braking, the assessment model 120 may flag this behavior as risky based on predefined thresholds. The assessment model 120 may then analyze the collected data in real time to assess whether it meets or designates from expected performance levels. Without limitation, the process of analyzing the dynamic telemetry data 112 may involve comparing the collected data to a plurality of predefined factors 116. Continuing, these predefined factors 116 may include specific thresholds, such as acceptable speed limits, safe acceleration or deceleration rates, or appropriate geospatial movement patterns. Continuing, by comparing the telemetry data against these predefined factors 116, the assessment model 120 can determine whether the transportation device 106 is being operated safely or if there are destinations from normal operating conditions. For example, if the transportation device 106 exceeds predefined speed thresholds in certain geographic zones, the model will flag this as a potential safety issue, allowing further analysis or corrective action. Continuing, based on this comparison, the processor calculates a safety score 122. Without limitation, the safety score 122 may reflect how well the transportation device 106 or its operator is adhering to safety guidelines. In a non-limiting example, the safety score 122 may be calculated using a weighted algorithm that accounts for factors such as speed, braking patterns, and adherence to traffic laws. Without limitation, a higher safety score 122 may indicate safer driving behavior, while a lower score may suggest risky or non-compliant actions. Continuing, the safety score 122 may be continuously updated as new telemetry data is collected, allowing the system to provide real-time feedback on the current safety performance. Without limitation, the safety score 122 may be used to alert 152 the driver, initiate corrective actions, or trigger automatic safety mechanisms within the vehicle.

With continued reference to FIG. 1, the assessment model 120 may include a machine learning model 124, wherein the machine learning model 124 is trained using training data 126 comprising historical telemetry data 128 associated with preset parameters 130. As used in this disclosure, "historical telemetry data" is data that has been collected over time from sensors, devices, or systems regarding the performance, behavior, or conditions of a monitored entity. Without limitation, unlike real-time or dynamic telemetry data 112, historical telemetry data 128 refers to past records, which may be stored, analyzed, and used for trends analysis, comparison, or decision-making. Without limitation, historical telemetry data 128 may include information such as vehicle speed, engine performance, fuel consumption, or environmental conditions collected over a specific period, and is often used to identify patterns, assess performance history, or predict future outcomes based on past behavior. As used in this disclosure, "preset parameters" are specific values, conditions, or settings that have been collected over time to establish the criteria used to control, influence, or guide the operation of a system, device, or process. In a non-limiting example, the preset parameters 130 may be predetermined and may be used as reference points or limits during the execution of tasks or analysis. Without limitation, the preset parameters 130 may include historical thresholds, time intervals, or configuration settings that governed how a system would respond to inputs or perform certain functions without requiring manual adjustment.

Still referring to FIG. 1, processor 102 is configured to display, using a downstream device 132, a command queue 134 comprising one or more of the plurality of predefined factors 116 as a function of the safety score 122. As used in this disclosure, "downstream device" is a device that accesses and interacts with apparatus 100. For instance, and without limitation, downstream device 132 may include a remote device and/or apparatus 100. In a non-limiting embodiment, downstream device 132 may be consistent with a computing device as described in the entirety of this disclosure. Without limitation, the downstream device 132 may include a display device. As used in this disclosure, a "display device" refers to an electronic device that visually presents information to the entity. In some cases, display device may be configured to project or show visual content generated by computers, video devices, or other electronic mechanisms. In some cases, display device may include a liquid crystal display (LCD), a cathode ray tube (CRT), a plasma display, a light emitting diode (LED) display, and any combinations thereof. In a non-limiting example, one or more display devices may vary in size, resolution, technology, and functionality. Display device may be able to show any data elements and/or visual elements as listed above in various formats such as, textural, graphical, video among others, in either monochrome or color. Display device may include, but is not limited to, a smartphone, tablet, laptop, monitor, tablet, and the like. Display device may include a separate device that includes a transparent screen configured to display computer generated images and/or information. In some cases, display device may be configured to present a graphical user-interface (GUI) to a user, wherein a user may interact with a GUI. In some cases, a user may view a GUI through display. Additionally, or alternatively, processor 102 be connected to display device. In one or more embodiments, transmitting the command queue may include displaying the command queue at a display device using a visual interface. As used in this disclosure, a "command queue" is a structured list of tasks, instructions, and/or operations that are organized in a specific sequence. In a non-limiting example, the command queue 134 may include at least a command 136. As used in this disclosure, a "command" is an instruction or directive given to a person, system, device, and/or process to perform a specific action or task. Without limitation, the command 136 may initiate an operation, alter system behavior, or trigger a response, and may be issued manually by a user or automatically by a program or system. In a non-limiting example, the command 136 may control hardware functions, execute software routines, or interact with external systems, and are often part of a sequence within a command queue 134 or checklist. In a non-limiting example, the command 136 may be awaiting execution or confirmation from a user. In a non-limiting example, the command queue 134 may function as a checklist where each command 136 or task may be processed, executed, or marked as completed by the user or system. In the context of automated systems or human-machine interactions, the command queue 134 may help ensure that important actions are carried out in the correct order and that no critical steps are missed. In a non-limiting example, a transportation services operator such as a driver might receive a command queue 134 of risk mitigation steps before starting a trip. In a non-limiting example, the risk mitigation steps may be customized on a per-user basis, taking into account previous actions that a specific user might have missed. For instance, without limitation, apparatus 100 may automatically identify past errors or overlooked steps and adapt the command queue 134 to include those specific steps for that user, enhancing safety and operational efficiency tailored to individual performance. Continuing, the command queue 134 may include actions like checking that all seatbelts are fastened, ensuring that the vehicle's doors are locked, inspecting tire pressure, and confirming the vehicle's location using GPS. Continuing, the operator may interact with the command queue 134 using a smartphone or onboard system, marking each item as completed to ensure that all necessary safety measures have been addressed before the vehicle begins moving. Continuing in another non-limiting example, an assistant working alongside the driver may receive a similar checklist focused on passenger safety. Without limitation, the command queue 134 might include tasks such as confirming that children are properly seated, checking that all luggage is securely stored, or verifying that the emergency kit is in place. Without limitation, the assistant may interact with the system, marking items as complete to provide real-time feedback on safety readiness. Continuing, the interaction 146 with the command queue 134 may ensure that the risk mitigation steps are followed and logged, improving safety for all occupants.

With continued reference to FIG. 1, at least a command 136 of the command queue 134 may include a visual analysis 138 of a physical environment. As used in this disclosure, "visual analysis" is the process of examining, interpreting, and/or processing visual data and/or imagery to extract meaningful information or insights. Without limitation, the visual analysis 138 may involve manual observation by a user or automated techniques such as computer vision, pattern recognition, or image processing algorithms. Continuing, visual analysis 138 may be applied to various types of visual inputs, such as photographs, videos, or sensor-generated imagery, to identify objects, detect anomalies, assess conditions, or perform other analytical tasks based on visual information. Without limitation, the visual analysis 138 may be done by a user and/or a computer as discussed in more detail below.

With continued reference to FIG. 1, as used in this disclosure, "physical environment" is a tangible, real-world surrounding or conditions in which a system, device, or process operates. Without limitation, the physical environment may include physical elements such as objects, structures, terrain, weather, and the like, that may influence or interact with the system. Continuing, the physical environment may affect the performance, functionality, and/or behavior of devices, and may require sensors or other tools to monitor and respond to environmental factors like temperature, humidity, light, and spatial constraints. For example, without limitation, the inspection of a car to mitigate risk for transportation services may involve multiple steps, some of which may be directed by at least a command 136 in a command queue 134. For instance, one command 136 may require a thorough visual analysis 138 of the physical environment surrounding the vehicle. Continuing, this may involve the transportation services operator, such as a driver or assistant, conducting a visual check of the parking area, ensuring that the car is parked in a safe location free from obstructions or potential hazards such as debris or nearby moving vehicles. Continuing, the operator may be required to document or mark this inspection as complete within the command queue 134, confirming that the surrounding environment is safe for both passengers and vehicle operation. In another non-limiting example, the visual analysis 138 may include another command 136 in the queue to prompt the operator to conduct an internal visual analysis 138 of the vehicle's physical condition. Continuing, this command 136 may involve checking critical elements such as the seatbelts, mirrors, and dashboard controls to ensure everything is functional. Without limitation, the operator may visually inspect seatbelts to confirm they are undamaged and working properly, ensuring passengers can safely buckle in. Additionally and or alternatively, the operator may check for warning lights on the dashboard that indicate maintenance issues, such as low tire pressure or fluid levels. Without limitation, each of these steps may be marked as completed in the command queue 134, providing a record of the visual analysis 138. In another non-limiting example, the risk mitigation process may include commands 136 to inspect and secure essential safety features of the vehicle. Without limitation, the operator may be directed to verify that the doors are properly locked, check that all passengers are seated safely, confirm that any child safety seats or cargo are securely fastened, and the like. Without limitation, the operator may conduct the visual analysis 138 of the vehicle's tires, looking for signs of wear or improper inflation that could pose a safety risk during transit. Continuing, once all tasks in the command queue 134 are completed and logged, the vehicle may be cleared for safe operation in transportation services. Without limitation, the command queue 134 may ensure that that potential risks are mitigated before the transportation services begins.

With continued reference to FIG. 1, in some embodiments, apparatus 100 may additionally include at least a camera. As used in this disclosure, a "camera" is a device that is configured to sense electromagnetic radiation, such as without limitation visible light, and generate an image representing the electromagnetic radiation. In some cases, a camera may include one or more optics. Exemplary non-limiting optics include spherical lenses, aspherical lenses, reflectors, polarizers, filters, windows, aperture stops, and the like. In some cases, at least a camera may include an image sensor. Exemplary non-limiting image sensors include digital image sensors, such as without limitation charge-coupled device (CCD) sensors and complimentary metal-oxide-semiconductor (CMOS) sensors, chemical image sensors, and analog image sensors, such as without limitation film. In some cases, a camera may be sensitive within a non-visible range of electromagnetic radiation, such as without limitation infrared. As used in this disclosure, "image data" is information representing at least a physical scene, space, and/or object. In some cases, image data may be generated by a camera. "Image data" may be used interchangeably through this disclosure with "image," where image is used as a noun. An image may be optical, such as without limitation where at least an optic is used to generate an image of an object. An image may be material, such as without limitation when film is used to capture an image. An image may be digital, such as without limitation when represented as a bitmap. Alternatively, an image may be comprised of any media capable of representing a physical scene, space, and/or object. Alternatively where "image" is used as a verb, in this disclosure, it refers to generation and/or formation of an image.

With continued reference to FIG. 1, in some embodiments, apparatus 100 may include a machine vision system that includes at least a camera. A machine vision system may use images from at least a camera, to make a determination about a scene, space, and/or object. For example, in some cases a machine vision system may be used for world modeling or registration of objects within a space. In some cases, registration may include image processing, such as, without limitation object recognition, feature detection, edge/corner detection, and the like. Non-limiting example of feature detection may include scale invariant feature transform (SIFT), Canny edge detection, Shi Tomasi corner detection, and the like. In some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the X and Y coordinates, may be performed using a two-dimensional projection of points in three dimensions onto a first frame, however. A third dimension of registration, representing depth and/or a Z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive Z-axis values of points on object permitting, for instance, derivation of further Z-axis points within and/or around the object using interpolation. This may be repeated with multiple objects in field of view, including without limitation environmental features of interest identified by object classifier and/or indicated by an operator. In an embodiment, X and Y axes may be chosen to span a plane common to two cameras used for stereoscopic image capturing and/or an XY plane of a first frame; a result, X and Y translational components and $\phi$ may be pre-populated in translational and rotational matrices, for affine transformation of coordinates of object, also as described above. Initial X and Y coordinates and/or guesses at transformational matrices may alternatively or additionally be performed between first frame and second frame, as described above. For each point of a plurality of points on object and/or edge and/or edges of object as described above, X and Y coordinates of a first stereoscopic frame may be populated, with an initial estimate of Z coordinates based, for instance, on assumptions about object, such as an assumption that ground is substantially parallel to an XY plane as selected above. Z coordinates, and/or X, Y, and Z coordinates, registered using image capturing and/or object identification processes as described above may then be compared to coordinates predicted using initial guess at transformation matrices; an error function may be computed using by comparing the two sets of points, and new X, Y, and/or Z coordinates, may be iteratively estimated and compared until the error function drops below a threshold level. In some cases, a machine vision system may use a classifier, such as any classifier described throughout this disclosure.

An exemplary machine vision camera that may be included in an environmental sensor (or an operator sensor) is an OpenMV Cam H7 from OpenMV, LLC of Atlanta, Georgia, U.S.A. OpenMV Cam comprises a small, low power, microcontroller which allows execution of machine vision applications. OpenMV Cam comprises an ARM Cortex M7 processor and a 640×480 image sensor operating at a frame rate up to 150 fps. OpenMV Cam may be programmed with Python using a Remote Python/Procedure Call (RPC) library. OpenMV CAM may be used to operate image classification and segmentation models, such as without limitation by way of TensorFlow Lite; detection motion, for example by way of frame differencing algorithms;

marker detection, for example blob detection; object detection, for example face detection; eye tracking; person detection, for example by way of a trained machine learning model; camera motion detection, for example by way of optical flow detection; code (barcode) detection and decoding; image capture; and video recording.

With continued reference to FIG. 1, each command 136 of the command queue 134 may be associated with a visual element 140 within a graphical user interface 142, wherein the visual element 140 is configured to receive user input 144 comprising selecting, through an interaction 146, the visual element 140, triggering an event handler 148 in response to the interaction 146, wherein the event handler 148 is operatively connected to the visual element 140, and executing, using the event handler 148, an associated action based on the interaction 146. As used in this disclosure, a "visual element" is any individual component that expresses an idea and/or conveys a message. A visual element 140 may include visual data such as, but not limited to, images, colors, shapes, lines, arrows, icons, photographs, infographics, text, any combinations thereof, and the like. A visual element 140 may include any data transmitted to display device, client device, and/or graphical user interface 142. In some embodiments, visual element 140 may be interacted with. For example, visual element 140 may include an interface, such as a button or menu. In some embodiments, visual element 140 may be interacted with using a user device such as a smartphone, tablet, smartwatch, or computer.

With continued reference to FIG. 1, a "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface 142. For example, links to decentralized platforms as described in this disclosure may be incorporated using icons. Using an icon may be a fast way to open documents, run programs etc. because clicking on them yields instant access. As used in this disclosure, "user input" is any data, command, or interaction provided by a user to a system, device, or application to influence its behavior, operation, or output. This input can be entered through various methods such as typing on a keyboard, selecting options on a touchscreen, speaking into a voice recognition system, or using other input devices like a mouse or sensors. User input 144 is processed by the system to execute tasks, modify settings, or provide feedback based on the user's needs or preferences. As used in this disclosure, an "interaction" is an exchange or communication between a user and a system, device, and/or process. In a non-limiting example, the interaction 146 may include input from the user thereby prompting a response or action from the system. Continuing, the interaction 146 may involve physical actions such as pressing a button, entering data, and/or navigating through a user interface. Without limitation, the interaction 146 may include passive forms of actions such as observing system feedback or receiving notifications. Without limitation, the interaction 146 may facilitate control, monitoring, and/or adjustment of system functions based on user commands or preferences. An "event handler," as used in this disclosure, is a module, data structure, function, and/or routine that performs an action in response to an event. In some embodiments, event handler may include a software element that is configured to perform an action in response to a user interaction with event handler graphic. For instance, and without limitation, the event handler 148 may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler 148 may generate prompts for further information, may compare data to validation rules such as requirements that the data in question be entered within certain numerical ranges, and/or may modify data and/or generate warnings to a user in response to such requirements.

With continued reference to FIG. 1, each command 136 within the command queue 134 may be represented as the visual element 140 within the graphical user interface 142 (GUI). For example, without limitation, the visual element 140 may include a button, checkbox, and/or icon, and may be designed to receive user input 144 through interactions 146 like tapping, clicking, or selecting the element on a display. Continuing, when the user interacts with this visual element 140, it may trigger the event handler 148 that is operatively connected to the element. Continuing, the event handler 148 may include a piece of code or logic that responds to the specific user input 144 and determines what action should follow. For instance, selecting a checkbox might indicate that a task, such as checking the vehicle's seatbelt status, has been completed. Continuing upon triggering the event handler 148, an associated action is executed based on the user's interaction 146. Continuing, this action may involve updating the status of the command 136 in the command queue 134, marking it as complete, or initiating the next step in the risk mitigation process. For example, if the user selects a visual element 140 corresponding to a door-locking task, the event handler 148 may verify that the command 136 has been executed and mark the task as completed in the system. Without limitation, this interaction-driven process ensures that all commands 136 in the command queue 134 are systematically addressed and that the user is guided through the checklist to mitigate risks, enhancing overall safety and operational efficiency.

With continued reference to FIG. 1, the score may be dynamically updated based on the interaction 146, wherein the interaction 146 comprises marking the command 136 as complete. In a non-limiting example, the interaction 146 may involve the user marking the command 136 as complete, such as finishing a specific task in the inspection process or executing a risk mitigation step. For example, without limitation, when a driver completes a command 136 to visually inspect the vehicle's tires or secure seatbelts, the driver may interact with the apparatus by marking that task as done. Continuing, this may signal to the apparatus that the task has been successfully performed, allowing the safety score 122 to reflect that completion. Continuing, as the commands 136 are marked as completed, the apparatus may recalculate the safety score 122 in real time, dynamically updating the safety score 122 to reflect the current risk level or compliance status. Continuing, each completed task may improve the safety score 122, indicating a higher level of safety and preparedness. For instance, completing critical safety checks like ensuring all doors are locked and seatbelts fastened may carry more weight in the score calculation. Without limitation, the dynamic nature of the safety score 122 may provide immediate feedback to the operator, offering a clear indication of safety readiness and any remaining tasks that need attention to achieve optimal safety performance before vehicle operation.

With continued reference to FIG. 1, the apparatus may further comprise a notification system 150 communicatively connected to the apparatus, wherein the notification system 150 is configured to transmit an alert 152 to a first communication channel 154 of a plurality of communication channels 156 and trigger predefined protocols 158 based on the alert 152. As used in this disclosure, a "notification system" is a system or mechanism designed to deliver alerts 152, messages, and/or updates based on specific triggers and/or events. Without limitation, the notification system 150 may provide real-time or scheduled notifications through various means, such as visual pop-ups, audible alerts 152, text messages, and/or push notifications. Without limitation, the alerts 152 may inform users of important information, actions required, system statuses, or any other relevant updates. In a non-limiting example, the notification system 150 may be integrated into devices or software applications of the apparatus. In another non-limiting example, the notification system 150 may be customized to deliver different types of alerts 152 based on predefined conditions and/or user preferences. As used in this disclosure, an "alert" is a notification or signal generated by the notification system 150 to provide information. In a non-limiting example, the alert 152 may provide information about an event, condition, and/or required action to a user. Without limitation, the alert 152 may be triggered by predefined factors 116 such as safety risks, system malfunctions, and/or threshold breaches. Without limitation, the alert 152 may be delivered in various forms, including visual indicators, audible sounds, vibrations, and/or digital messages. Continuing, alerts 152 may be designed to capture the user's attention, prompting them to respond, take corrective action, and/or acknowledge the alert 152. As used in this disclosure, a "communication channel" is a medium or pathway through which data, information, or signals are transmitted between systems, devices, or users. Without limitation, communication channels 156 may be physical, such as wired connections, or wireless, such as radio frequency, Wi-Fi, or Bluetooth. In a non-limiting example, the communication channels 156 may facilitate the exchange of information, enabling communication between different components within a system, or between a system and its users, and may vary in capacity, speed, and reliability depending on the technology used. For example, one communication channel 154 of the plurality of communication channels 156 may include text. As used in this disclosure, "predefined protocols" are established sets of rules, procedures, or guidelines that govern how systems, devices, or processes communicate, interact, and/or operate. The predefined protocols 158 may be determined in advance and ensure consistent, standardized behavior across a system or network. Continuing, the predefined protocols 158 may dictate data formats, transmission methods, security measures, or the sequence of actions required for successful communication or operation, facilitating seamless interaction 146 between different components or entities.

With continued reference to FIG. 1, the notification system 150 may be configured to prioritize, using the safety score 122, the alerts 152. For instance, without limitation, the safety score 122 may reflect the current level of risk or safety, and alerts 152 that are associated with higher-risk situations or more critical safety concerns would be prioritized. For example, if the safety score 122 drops significantly due to unfastened seatbelts or excessive speed, the notification system 150 would prioritize sending alerts 152 related to these urgent issues before less critical ones, such as low fuel. Without limitation, this may help ensure that the most important risks are addressed immediately.

With continued reference to FIG. 1, the notification system 150 may be configured to set the alert 152 as a function of the predefined factors 116. Without limitation, the predefined factors 116 may include specific safety thresholds, such as speed limits, required maintenance intervals, or acceptable temperature ranges for vehicle components. Continuing, when the dynamic telemetry data 112 indicates that one or more of these factors have been exceeded or violated, the notification system 150 may set an alert 152 accordingly. For instance, if the engine temperature exceeds the preset safe operating range, the system triggers the alert 152 to warn the driver, prompting them to take corrective action to prevent damage.

With continued reference to FIG. 1, the notification system 150 may be configured to set the alert 152 as a function of historical command data 160. Without limitation, the notification system 150 may take into account the user's past actions or compliance with previous commands when determining when and how to send an alert 152. For example, without limitation, if the historical command data 160 shows that a driver frequently misses seatbelt checks, the notification system 150 may issue a stronger or more urgent alert 152 when the seatbelt check command is once again incomplete. Continuing, the notification system 150 may consider patterns in historical data to better tailor alerts 152 to address recurring issues or user behaviors, improving the overall safety and efficiency of the system Exemplary embodiments have been disclosed above and illustrated in the accompanying drawings. It will be understood by those skilled in the art that various changes, omissions and additions may be made to that which is specifically disclosed herein without departing from the spirit and scope of the present invention.

Figure 2A:
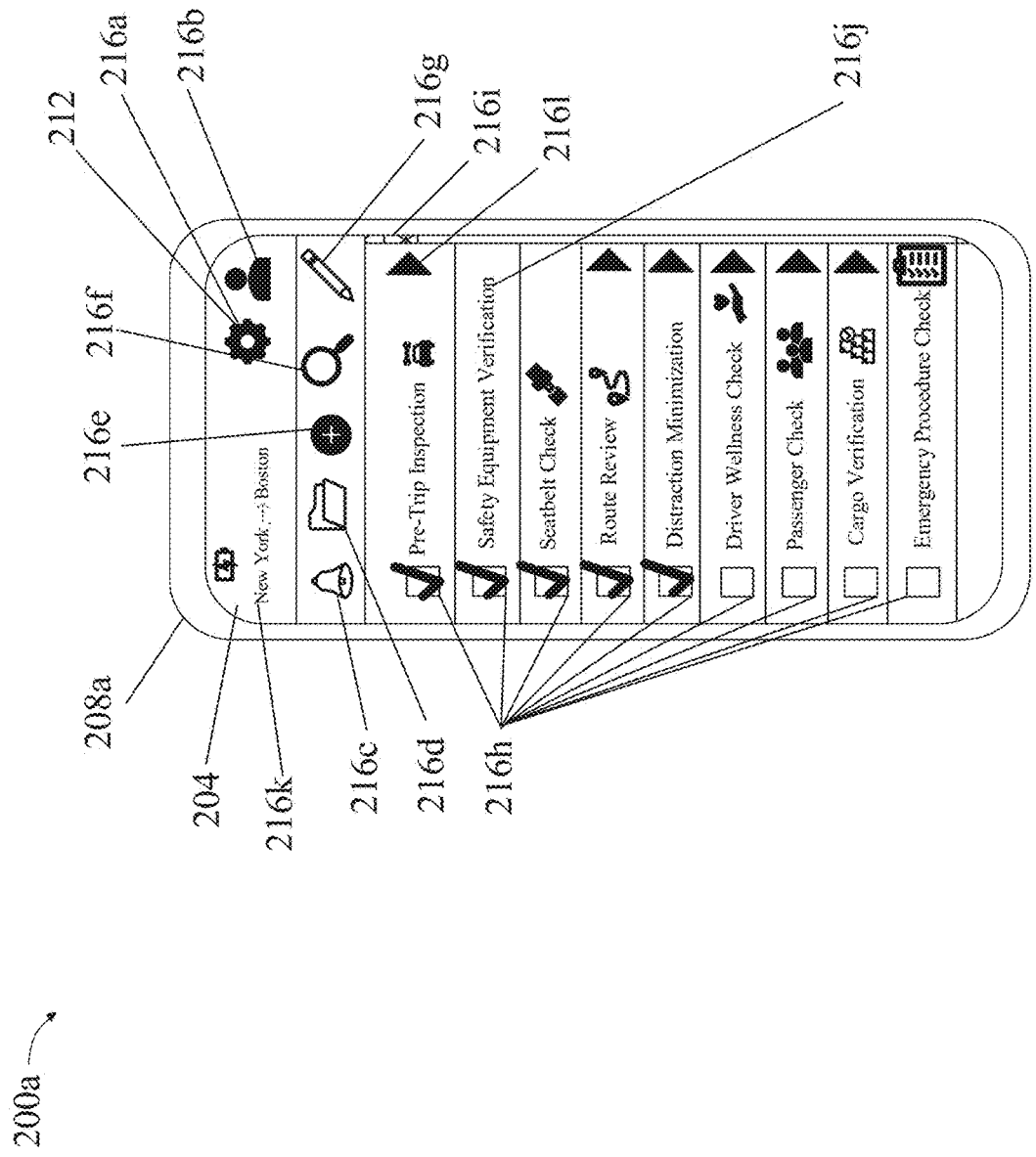
FIG. 2A is an exemplary illustration of a graphical user interface on a downstream device comprising a mobile device.

Referring now to FIG. 2A, an exemplary illustration 200a of a graphical user interface on a downstream device comprising a mobile device. In an embodiment, the graphical user interface 204 may be displayed using a mobile device 208a. In an embodiment, the graphical user interface 204 may include at least a visual element 212. In an embodiment, the visual element 212 may include an interactive element 216a-1. In an embodiment the interactive element 216a-1 may allow a user to engage directly with the graphical user interface 204 through a variety of actions.

In an embodiment, the interactive element 216a-1 may include a settings gear 216a, a profile icon 216b, a notification icon 216c, a folder 216d, a new task icon 216e, a find icon 216f, an edit icon 216g, a check box icon 216h, a scroll bar 216i, text description 216j, and the like.

In an embodiment, the interactive element 216a-1 may include a settings gear 216a. In an embodiment, the settings gear 216a may enable users to access the system or application settings where they may modify preferences and configurations. Without limitation, by clicking on the settings gear 216a, users may adjust features like notifications, display options, account details, and the like. In an embodiment, the settings gear 216a may represent control over personalizing the environment within the application. In an embodiment, the settings gear 216*a* may ensure that users can customize their experience to meet their specific needs.

In an embodiment, the interactive element 216*a*-1 may include a profile icon 216*b*, which may allow users to access their personal profile settings. In an embodiment, the profile icon 216*b* may link to a page where users may view and edit their personal information, such as their name, contact details, or profile picture. In an embodiment, the profile icon 216*b* may make it simple for users to manage their account and view related data quickly. In an embodiment, the profile icon 216*b* may be placed in a convenient location, allowing easy access to account settings. In an embodiment, the profile icon 216*b* may help users maintain control over their profile, ensuring that their information stays up-to-date.

In an embodiment, the interactive element 216*a*-1 may include a notification icon 216*c*, which may allow users to set or receive notifications based on specific criteria. In an embodiment, the notification icon 216*c* may be configured to provide alerts related to user-defined parameters, such as time-based reminders, status changes of monitored activities, or updates from external sources. The notification icon 216*c* may also allow users to customize the type, frequency, and/or method of delivery for these notifications, including push notifications, email alerts, or other communication channels.

In an embodiment, the interactive element 216*a*-1 may include a folder icon 216*d*, which may represent access to a file or document management system. Without limitation, by clicking on the folder icon 216*d* it may open a directory or list of stored files, allowing users to organize their content within the application. In an embodiment, the folder icon 216*d* may be essential for managing documents, media, or other file types efficiently. In an embodiment, the folder icon 216*d* may be associated with file storage and navigation, making it a familiar and intuitive tool for users. In an embodiment, the folder icon 216*d* may aid in keeping information organized and accessible within the system.

In an embodiment, the interactive element 216*a*-1 may include a new task icon 216*e*, which may allow users to create or add a new item to their task list or project. In an embodiment, the new task icon 216*e* may provide a quick way for users to input new assignments or goals, streamlining task management. In an embodiment, the new task icon 216*e* once clicked, may open a form or prompt where users may specify details about the new task. In an embodiment, the new task icon 216*e* may help users stay organized by adding tasks efficiently as they arise. In an embodiment, the new task icon 216*e* may be a valuable tool for productivity, helping users keep track of their to-do lists.

In an embodiment, the interactive element 216*a*-1 may include a find icon 216*f*, which may function as a search tool for locating specific information within the application. In an embodiment, the find icon 216*f* may allow users to quickly search through data, files, or content to pinpoint exactly what they need. In an embodiment, the find icon 216*f* may be especially useful in applications that manage large volumes of information or files. In an embodiment, the find icon 216*f* may enhance efficiency by reducing the time spent manually browsing through content. Continuing, by providing a fast search function, users may access information more quickly and effectively.

In an embodiment, the interactive element 216*a*-1 may include an edit icon 216*g*, which may enable users to modify or update existing content within the application. Continuing, by clicking on the edit icon 216*g*, it may bring users to an editable version of the item, such as a text document, task, or file. In an embodiment, the edit icon 216*g* may allow users to make corrections or updates as needed, maintaining the accuracy of the information. In an embodiment, the edit icon 216*g* may ensure that content remains current and can be easily adjusted as situations or data change. In an embodiment, the edit icon 216*g* may be a crucial tool for users who frequently update or revise their work.

In an embodiment, the interactive element 216*a*-1 may include a check box icon 216*h*, which may allow users to select or deselect items in a list or form. In an embodiment, the check box icon 216*h* may be used in task management systems to indicate whether a task has been completed or is still pending. In an embodiment, the check box icon 216*h* may allow a user to click the box to mark items as done or choose multiple options when interacting with a form. In an embodiment, the check box icon 216*h* may simplify user input by providing a clear, visual way to make selections. Check boxes may be intuitive tools for tracking progress or making choices.

In an embodiment, the interactive element 216*a*-1 may include a scroll bar icon 216*i*, which may provide users with the ability to navigate through long pages of content. In an embodiment, the scroll bar icon 216*i* may be essential when the content exceeds the available screen space, allowing users to scroll vertically or horizontally. In an embodiment, the scroll bar icon 216*i* may help users move through information at their own pace, ensuring they can access all relevant content. In an embodiment, the scroll bar icon 216*i* may be particularly useful in applications with extensive data, such as documents or databases. In an embodiment, the scroll bar icon 216*i* may enhance the user interface by making navigation simple and intuitive.

In an embodiment, the interactive element 216*a*-1 may include a text description 216*j*, which may provide additional information or context about a specific icon or feature. In an embodiment, the text description 216*j* may help users understand the purpose of an icon, making the interface more user-friendly. In an embodiment, the text description 216*j* may be displayed when a user hovers over an icon, providing clarification without cluttering the interface. In an embodiment, the text description 216*j* may improve the usability of the system, particularly for new or unfamiliar users.

In an embodiment, the interactive element 216*a*-1 may include a header 216*k*. In an embodiment the header 216*k* may serve as a graphical or textual element positioned at the top of the user interface or section. Without limitation, the header 216*k* may display relevant information such as titles, labels, and/or categories, providing context for the content or functionality that follows. In an embodiment, the header 216*k* may be interactive, allowing users to click, tap, or otherwise engage with it to trigger additional actions, such as expanding or collapsing sections, navigating to different screens, or displaying further details. In an embodiment, the header 216*k* may also be customizable, allowing users or administrators to modify its appearance, content, or behavior according to specific preferences or needs. In an embodiment, the header 216*k* may include the travel departure location and the destination.

In an embodiment, the interactive element 216*a*-1 may include a drop down carrot 216*l*. In an embodiment, the drop down carrot 216*l* may indicate the presence of a collapsible or expandable menu, allowing users to click on it to reveal additional options or settings. In an embodiment, the drop down carrot 216*l* may be placed beside menu items or sections where further choices or configurations are available. In an embodiment, the drop down carrot 216*l* may provide users with a way to hide or display extra content. In an embodiment, the drop down carrot 2161 may contribute to a cleaner, more organized interface. In an embodiment, the drop down carrot 2161 may assist in managing space on the screen, ensuring that users only see relevant information when needed.

Figure 2B:
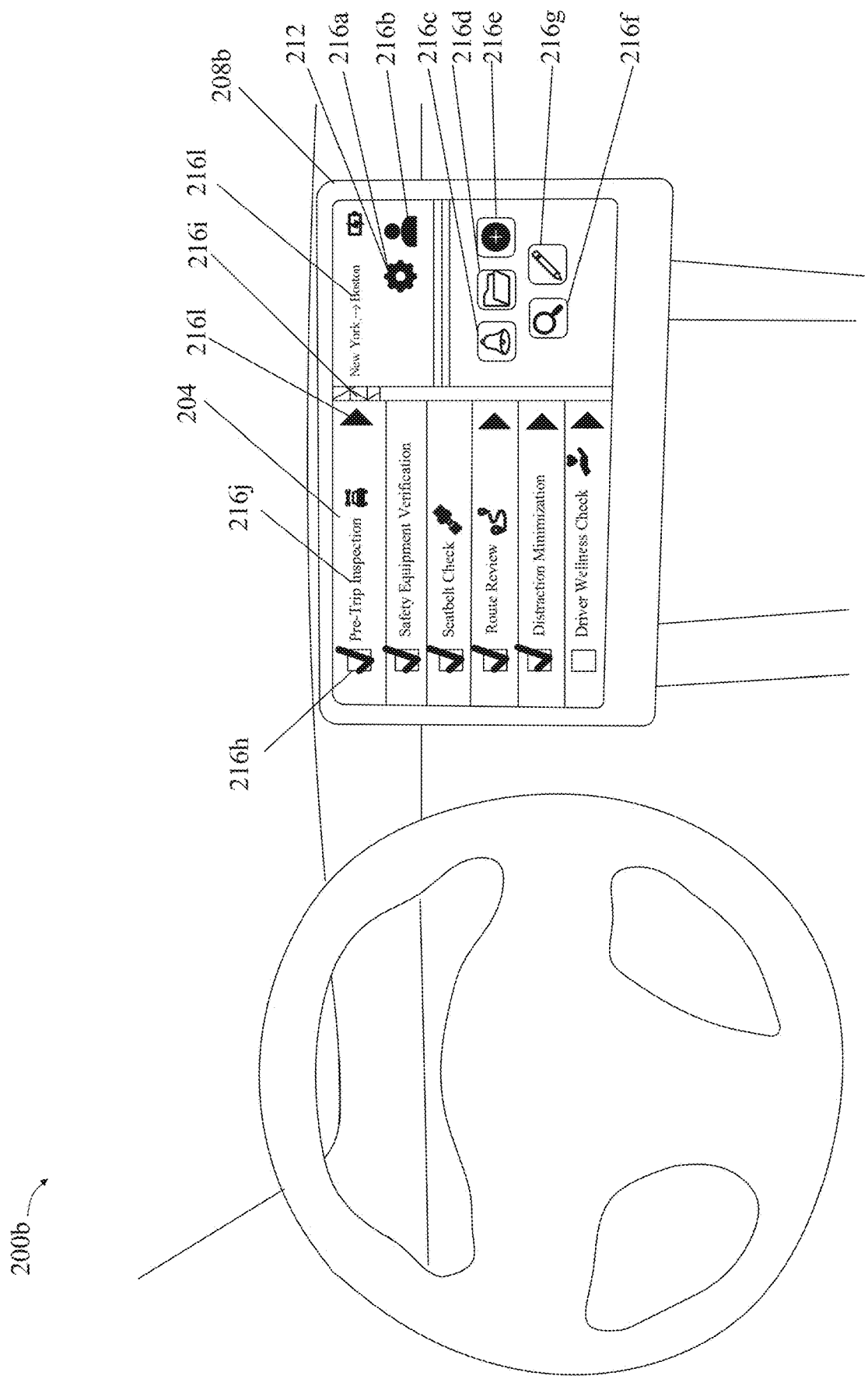
FIG. 2B is an exemplary illustration of a graphical user interface on a downstream device comprising a vehicle device.

Referring now to FIG. 2B, an exemplary illustration 200b a graphical user interface on a downstream device comprising a vehicle device. In an embodiment, the graphical user interface 204 may be displayed using a vehicle device 208b. In an embodiment, the graphical user interface 204 may include at least a visual element 212. In an embodiment, the visual element 212 may include an interactive element 216a-1. In an embodiment, the graphical user interface 204 of the vehicle device 208b may be the same or substantially similar to the graphical user interface 204 of the mobile device 208a.

Figure 3:
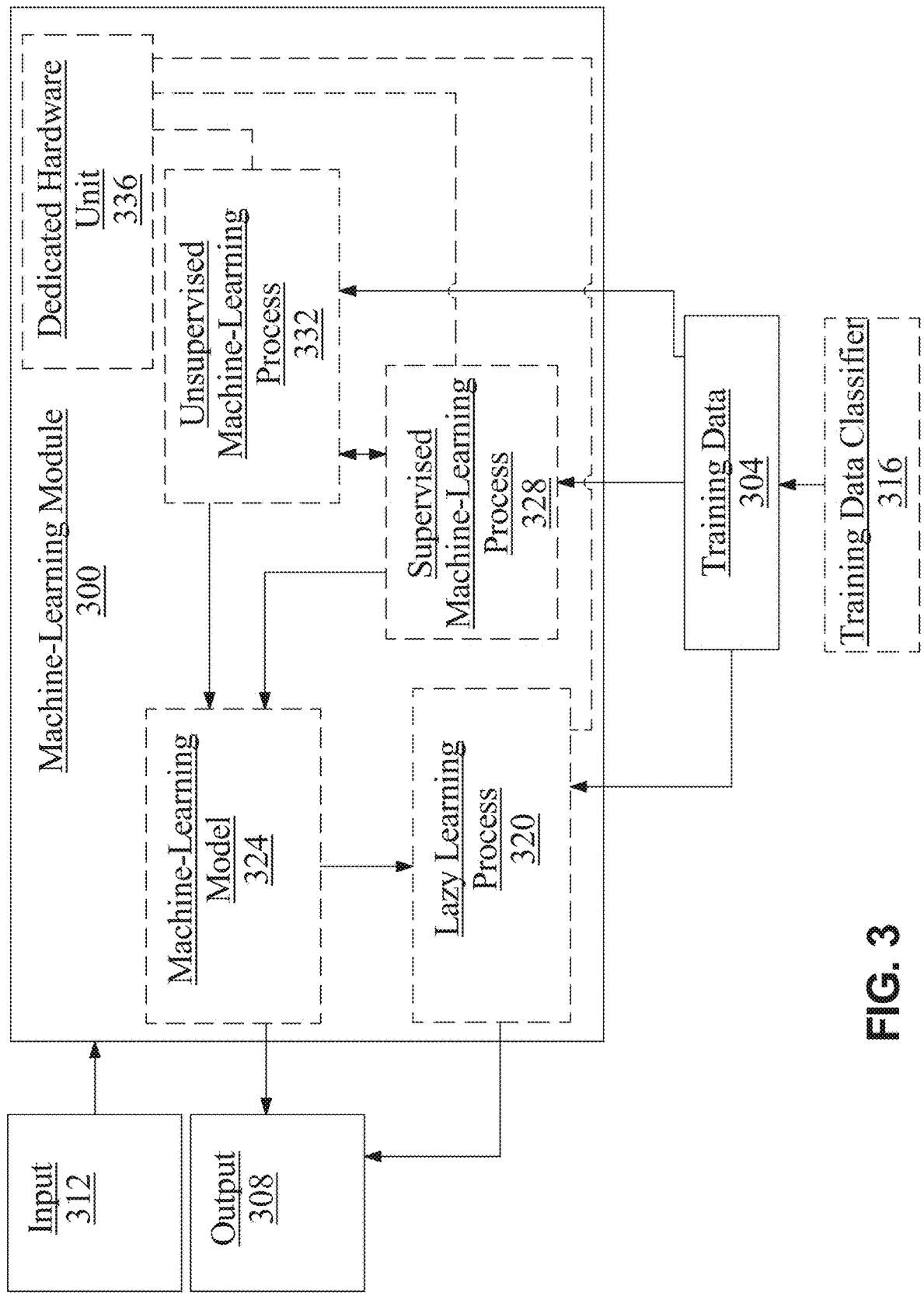
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example inputs may include dynamic telemetry data and plurality of predefined factors and outputs may include the safety score, as described herein.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to categories of safety scores.

Still referring to FIG. 3, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)+P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or using user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard designations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard designation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created using the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include dynamic telemetry data and plurality of predefined factors as described above as inputs, safety scores as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
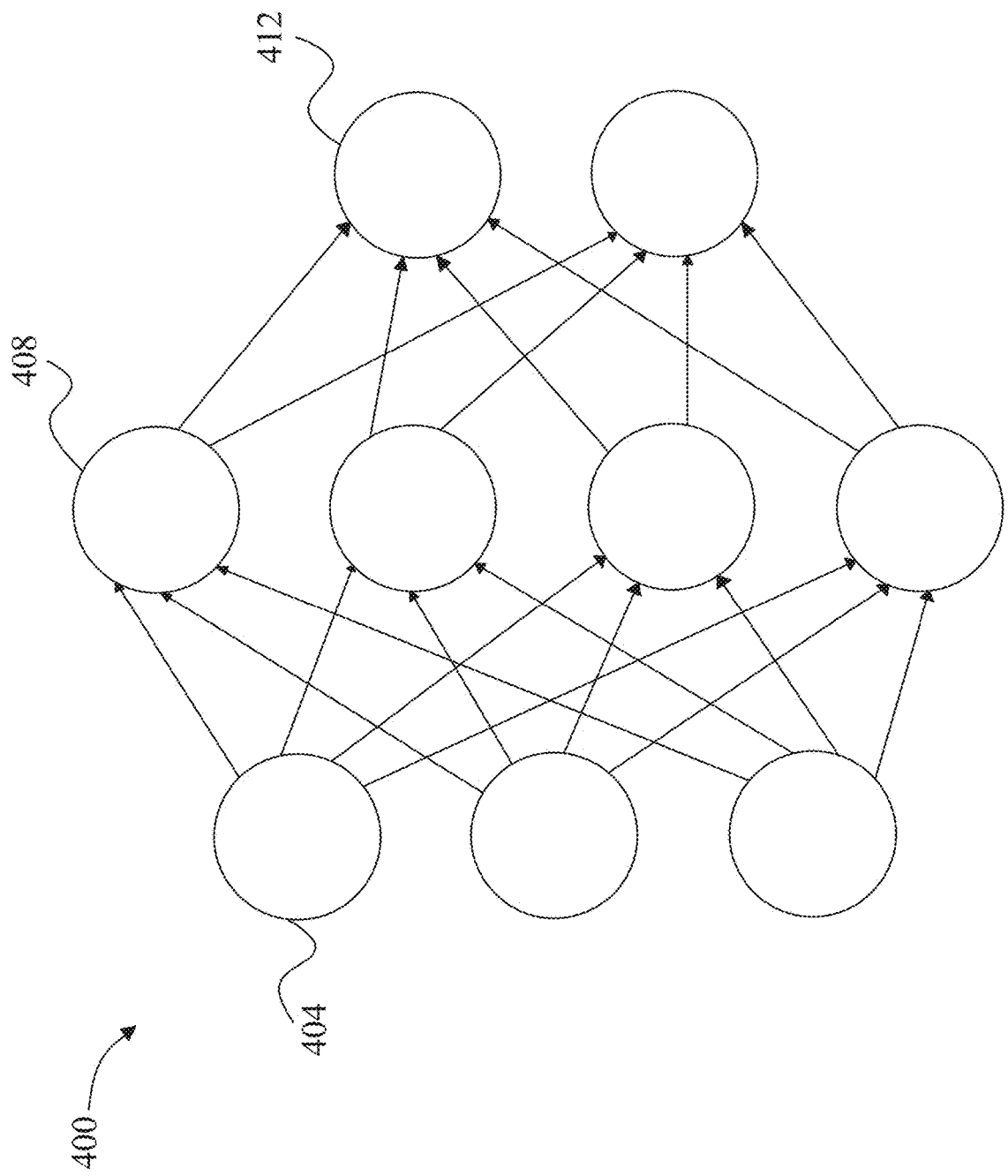
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created using the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
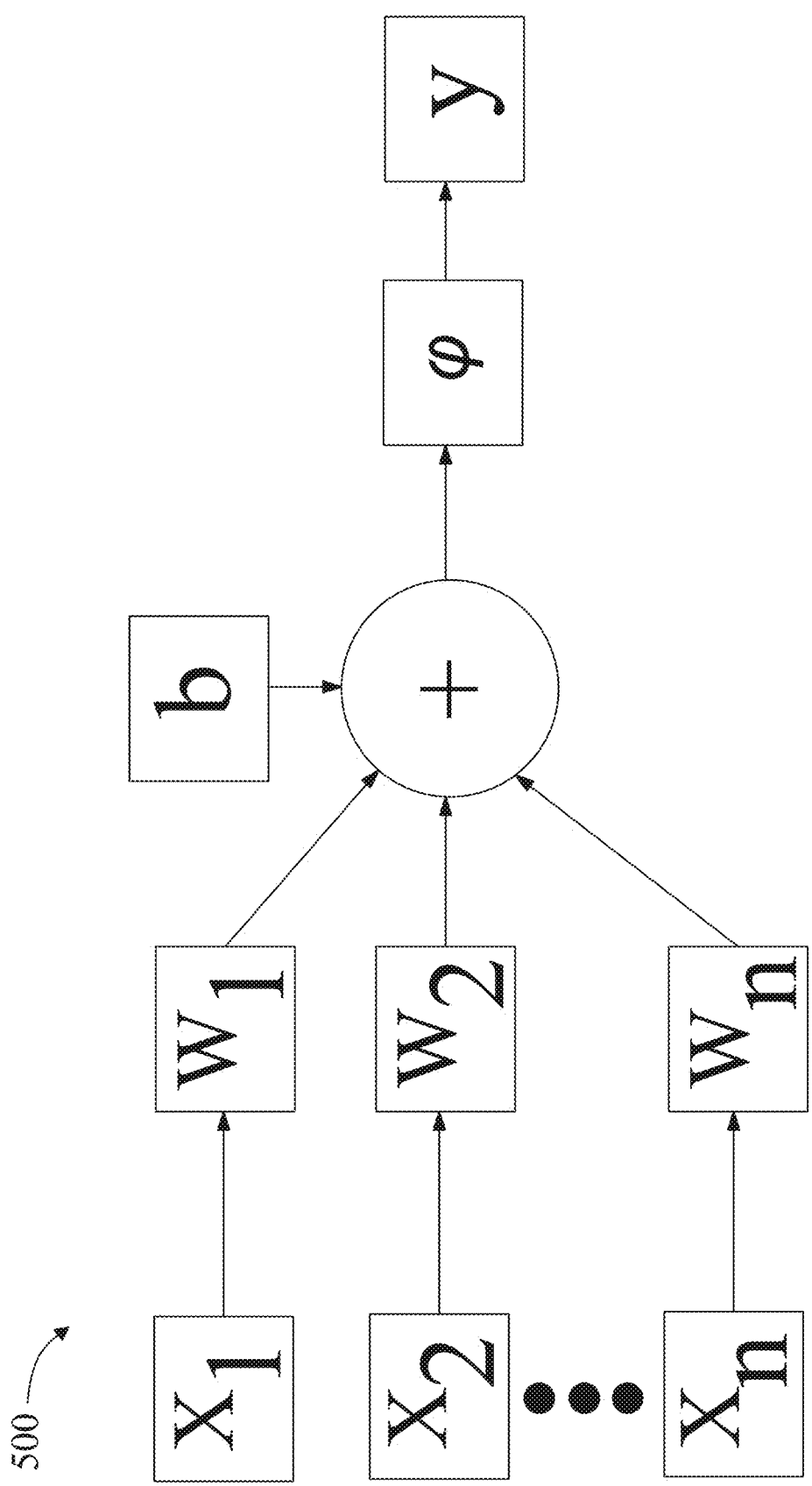
FIG. 5 is a diagram of an exemplary embodiment of a node of a neural network.

Referring now to FIG. 5, an exemplary embodiment of a node 500 of a neural network is illustrated. A node may include, without limitation, a plurality of inputs xi that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x - e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are xi, a swish function such as $f(x)=x*\text{sigmoid}(x)$, a Gaussian error linear unit function such as $f(x)=\alpha(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs xi that may be used as activation functions. As a non-limiting and illustrative example, node may perform a weighted sum of inputs using weights wi that are multiplied by respective inputs xi. Additionally or alternatively, a bias b may be added to the weighted sum of the inputs such that an offset is added to each unit in the neural network layer that is independent of the input to the layer. The weighted sum may then be input into a function p, which may generate one or more outputs y. Weight wi applied to an input xi may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights wi may be determined by training a neural network using training data, which may be performed using any suitable process as described above.

Figure 6:
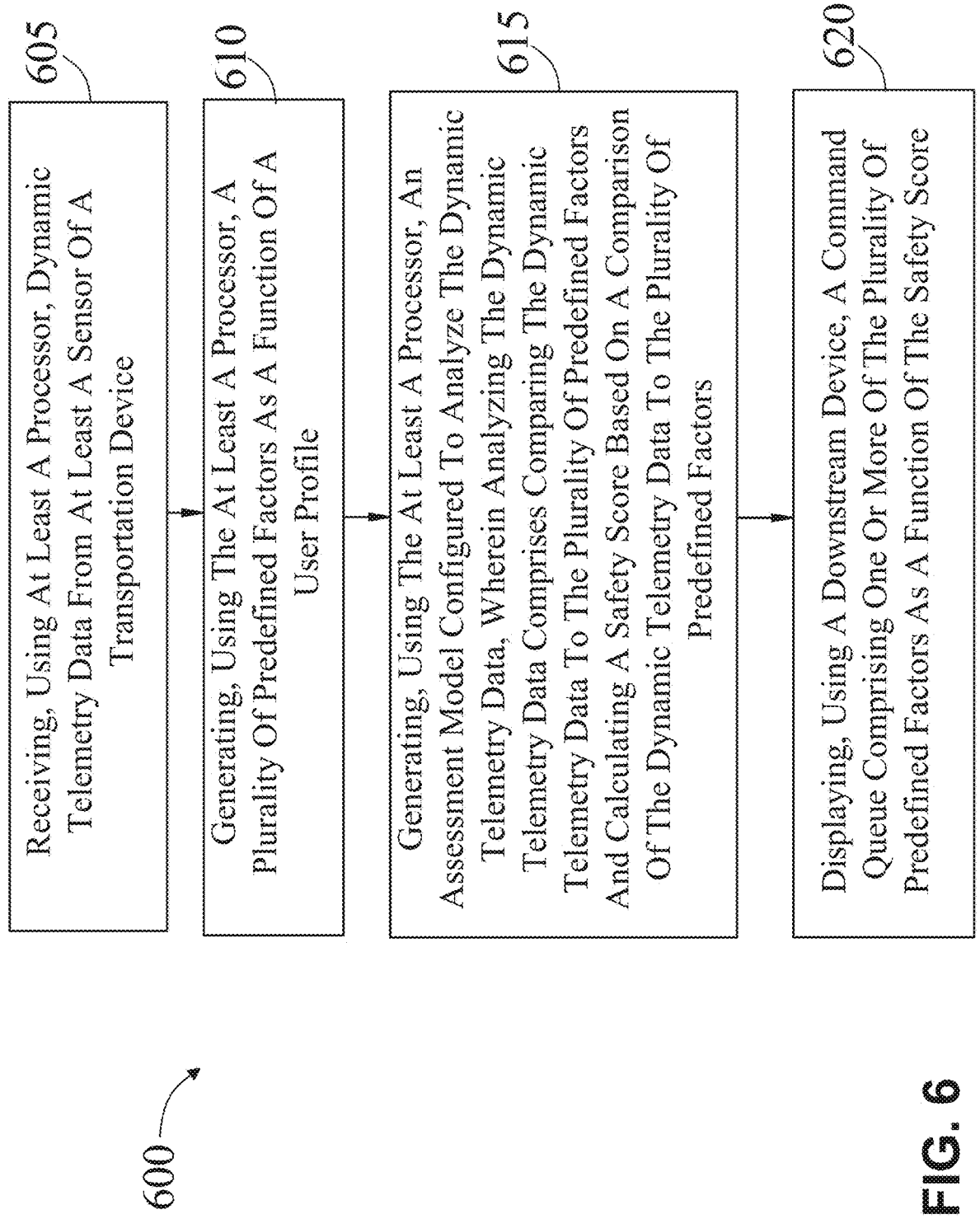
FIG. 6 is a block diagram of an exemplary method for determining a command queue as a function of sensor data of a transportation device.

Referring now to FIG. 6, a flow diagram of an exemplary method 600 for determining a command queue as a function of sensor data of a transportation device is illustrated. At step 605, method 600 includes receiving, using at least a processor, dynamic telemetry data from at least a sensor of a transportation device. In an embodiment, the dynamic telemetry data may include geospatial data. This may be implemented as described and with reference to FIGS. 1-5.

Still referring to FIG. 6, at step 610, method 600 includes generating, using the at least a processor, a plurality of predefined factors as a function of a user profile. This may be implemented as described and with reference to FIGS. 1-5.

Still referring to FIG. 6, at step 615, method 600 includes generating, using the at least a processor, an assessment model configured to analyze the dynamic telemetry data, wherein analyzing the dynamic telemetry data comprises comparing the dynamic telemetry data to the plurality of predefined factors and calculating a safety score based on a comparison of the dynamic telemetry data to the plurality of predefined factors. In an embodiment, the assessment model may include a machine learning model, wherein the machine learning model is trained using training data comprising historical telemetry data associated with preset parameters. This may be implemented as described and with reference to FIGS. 1-5.

Still referring to FIG. 6, at step 620, method 600 includes displaying, using a downstream device, a command queue comprising one or more of the plurality of predefined factors as a function of the safety score. In an embodiment, at least a command of the command queue may include a visual analysis of a physical environment. In an embodiment, each command of the command queue may be associated with a visual element within a graphical user interface, wherein the visual element is configured to receive user input comprising selecting, through an interaction, the visual element, triggering an event handler in response to the interaction, wherein the event handler is operatively connected to the visual element, and executing, using the event handler, an associated action based on the interaction. In an embodiment, the score is dynamically updated based on the interaction, wherein the interaction comprises marking the command as complete. In an embodiment, the apparatus further may include a notification system communicatively connected to the at least a processor, wherein the notification system may be configured to transmit an alert to a first communication channel of a plurality of communication channels and trigger predefined protocols based on the alert. In an embodiment, the notification system may be configured to prioritize, using the safety score, the alerts. In an embodiment, the notification system may be configured to set the alert as a function of the predefined factors. In an embodiment, the notification system may be configured to set the alert as a function of historical command data. This may be implemented as described and with reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
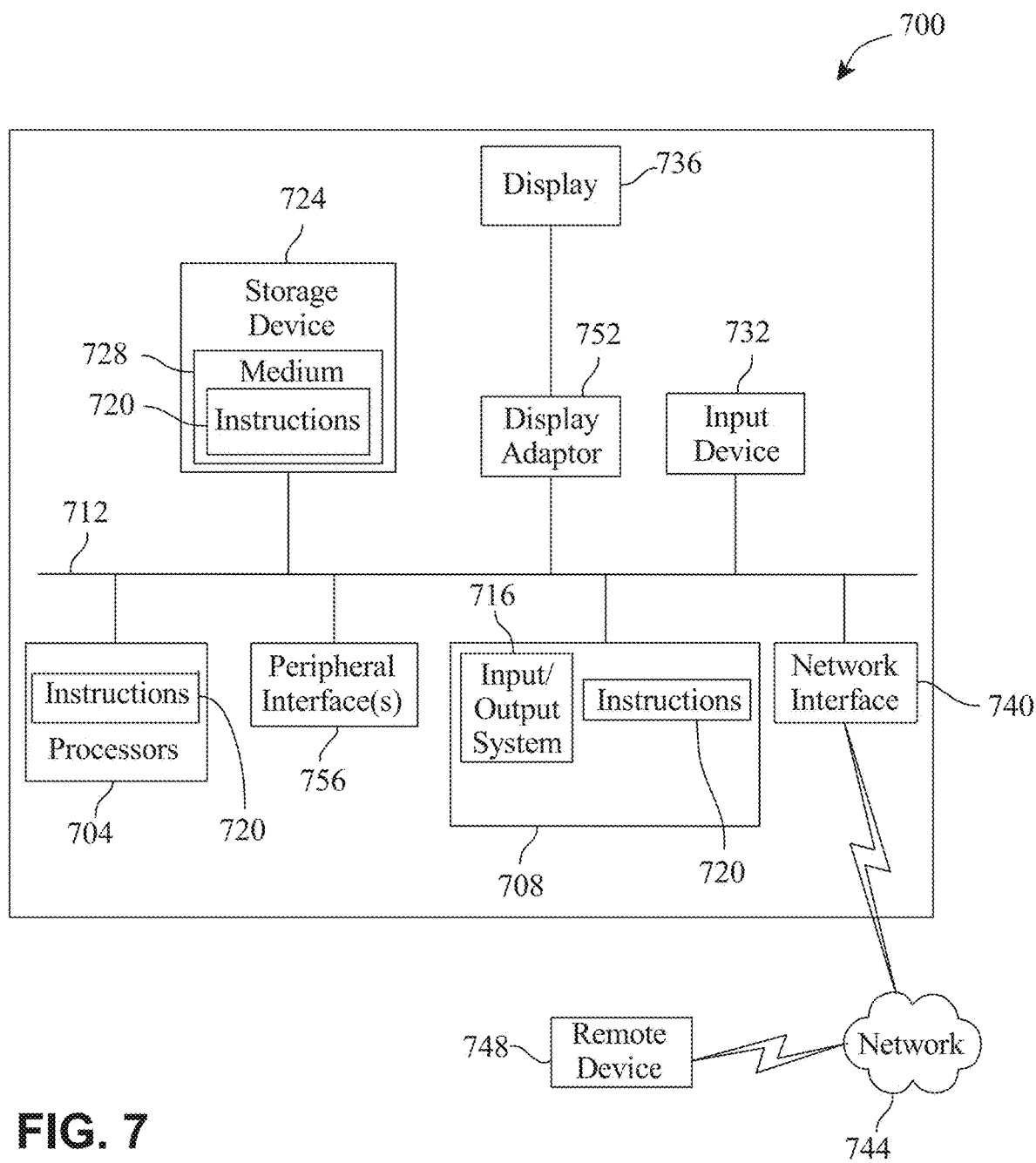
FIG. 7 is a block diagram of a computing system that can be used to implement any one or more of the methodologies disclosed herein and any one or more portions thereof.

FIG. 7 shows a diagrammatic representation of one embodiment of computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, using a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., using an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 using input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 using any of a variety of interfaces (not shown) including, but not limited to, a serial interface, a parallel interface, a game port, a USB interface, a FIRE-WIRE interface, a direct interface to bus 712, and any combinations thereof. Input device 732 may include a touch screen interface that may be a part of or separate from display device 736, discussed further below. Input device 732 may be utilized as a user selection device for selecting one or more graphical representations in a graphical interface as described above.

A user may also input commands and/or other information to computer system 700 using storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 using network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 using a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for determining a command queue as a function of sensor data of a transportation device, wherein the apparatus comprises:
   the transportation device comprising at least a sensor configured to detect a signal relating to the transportation device; and at least a computing device, wherein the computing device comprises:
a memory; and
at least a processor communicatively connected to the memory, wherein the memory contains instructions configuring the at least a processor to:
receive dynamic telemetry data from the at least a sensor of the transportation device;
generate a plurality of predefined factors and a safety score associated with the plurality of predefined factors as a function of a user profile, wherein the user profile comprises data that represents a user; and
display, using a downstream device, a command queue comprising one or more of the plurality of predefined factors as a function of the safety score, wherein each command of the command queue is customized to the user and comprises a directive to perform a task, wherein at least a command of the command queue comprises at least one task historically missed by the user, and wherein:
each command of the command queue is associated with a visual element within a graphical user interface, wherein the visual element is configured to receive user input through an interaction of the visual element; and
the safety score is dynamically updated based on the interaction, wherein the interaction comprises marking a command within the command queue as complete.

2. The apparatus of claim 1, wherein generating the plurality of predefined factors and the safety score comprises:
generating an assessment model configured to analyze the dynamic telemetry data,
wherein analyzing the dynamic telemetry data comprises:
comparing the dynamic telemetry data to the plurality of predefined factors.

3. The apparatus of claim 1, wherein the safety score comprises a compliance of the plurality of predefined factors.

4. The apparatus of claim 1, wherein at least one predefined factor of the plurality of predefined factors comprises a rapid acceleration of the transportation device.

5. The apparatus of claim 1, wherein the command queue comprises one or more commands, and wherein at least one command of the one or more commands comprises an alert.

6. The apparatus of claim 1, wherein the command queue comprises one or more operations to be addressed prior to a movement of the transportation device.

7. The apparatus of claim 1, wherein the dynamic telemetry data comprises geospatial data.

8. The apparatus of claim 1, wherein the downstream device comprises a mobile device associated with an operator of the transportation device.

9. The apparatus of claim 1, further comprising a notification system communicatively connected to the at least a processor, wherein the notification system is configured to:
transmit one or more alerts to a first communication channel of a plurality of communication channels; and
trigger predefined protocols based on the one or more alerts.

10. The apparatus of claim 9, wherein the notification system is configured to prioritize the one or more alerts as a function of the safety score.

11. A method for determining a command queue as a function of sensor data of a transportation device, wherein the method comprises:
receiving, using at least a processor, dynamic telemetry data from at least a sensor of a transportation device;
generating, use the at least a processor, a plurality of predefined factors and a safety score associated with the plurality of predefined factors as a function of a user profile,
wherein the user profile comprises data that represents a user; and
displaying, using a downstream device, a command queue comprising one or more of the plurality of predefined factors as a function of the safety score, wherein each A command of the command queue is customized to the user and comprises a directive to perform a task, wherein at least a command of the command queue comprises at least one task historically missed by the user, and wherein:
each command of the command queue is associated with a visual element within a graphical user interface, wherein the visual element is configured to receive user input through an interaction of the visual element; and
the safety score is dynamically updated based on the interaction, wherein the interaction comprises marking a command within the command queue as complete.

12. The method of claim 11, wherein generating, using the at least a processor, the plurality of predefined factors and the safety score comprises:
generating an assessment model configured to analyze the dynamic telemetry data,
wherein analyzing the dynamic telemetry data comprises:
comparing the dynamic telemetry data to the plurality of predefined factors.

13. The method of claim 11, wherein the safety score comprises a compliance of the plurality of predefined factors.

14. The method of claim 11, wherein at least one predefined factor of the plurality of predefined factors comprises a rapid acceleration of the transportation device.

15. The method of claim 11, wherein the command queue comprises one or more commands, and wherein at least one command of the one or more commands comprises an alert.

16. The method of claim 11, wherein the command queue comprises one or more operations to be addressed prior to a movement of the transportation device.

17. The method of claim 11, wherein the dynamic telemetry data comprises geospatial data.

18. The method of claim 11, wherein the downstream device comprises a mobile device associated with an operator of the transportation device.

19. The method of claim 11, further comprising:
transmitting, using a notification system, one or more alerts to a first communication channel of a plurality of communication channels; and
triggering predefined protocols based on the one or more alerts.

20. The method of claim 19, wherein the notification system is configured to prioritize the one or more alerts as a function of the safety score.

* * * * *